United States Patent
Hovey

[11] 3,713,245
[45] Jan. 30, 1973

[54] INSECT CATCHERS
[76] Inventor: Patrick Bruce Hovey, 78, Brookman's Avenue, Brookmans Park, Hatfield, England
[22] Filed: Dec. 30, 1970
[21] Appl. No.: 102,683

[52] U.S. Cl. ...................................43/110, 43/134
[51] Int. Cl. ..........................A01m 1/10, A01m 3/00
[58] Field of Search..........43/110, 134, 61, 111, 121, 43/122, 133, 135; 131/242

[56] References Cited

UNITED STATES PATENTS

| 25,961 | 11/1859 | Eames | 43/110 |
|---|---|---|---|
| 181,197 | 8/1876 | Olson | 43/110 |

FOREIGN PATENTS OR APPLICATIONS

| 576,344 | 5/1958 | Italy | 131/242 |

Primary Examiner—Warner H. Camp
Attorney—Hauke, Gifford & Patalidis

[57] ABSTRACT

A portable trap for insects and other small creatures comprising a chamber having an opening which can be closed by a plurality of iris type shutter members pivotally mounted around the periphery of the opening.

7 Claims, 8 Drawing Figures

PATENTED JAN 30 1973

3,713,245

INVENTOR
PATRICK B. HOVEY
BY Hauke, Gifford and Patalidis
ATTORNEYS.

INSECT CATCHERS

BACKGROUND OF THE INVENTION

This invention relates to a portable trap for insects and other small creatures.

SUMMARY OF THE INVENTION

According to the invention a portable trap for insects and other small creatures comprises a chamber having an opening, a plurality of shutter members pivotally mounted around the periphery of the opening for movement in the plane of the opening, and means for operating the shutter members to open or to close the opening in the chamber. Preferably the shutter members are operable to move in unison.

The chamber may be a hemispherical dome and a base plate may extend from the edge of the hemisphere for contracting a surface. Thus, in operation, the dome is placed over a small creature on, for example, a flat surface so that the base plate abuts with the surface, whereupon the shutter members are operated thus closing the dome and trapping the creature therein. The shutter members are preferably arranged so that when they are in the closed position there is a small gap between adjacent shutters thereby preventing the legs of a trapped creature from being caught between the shutter members.

A spring may be included in the device for operating the shutter members; for example, the spring may be held by a catch under tension when the shutter members are in the open position, so that when the catch is released the spring causes the shutter members to close.

According to another feature of the invention, a trap comprises an open domed chamber of circular cross-section having a circular flange extending outwardly from the edge of the opening, a flat circular ring member mounted beneath and concentrically with the flange, the ring member being angularly displaceable relative to the flange, a plurality of shutter members mounted between the flange and a base plate fixed relatively to the flange, the shutter members being pivoted upon the flange and/or the base plate and in engagement with the ring member so that in operation, depending upon the direction in which the ring member is turned, the shutter members turn in synchronization upon their pivots either to open or to close the chamber opening.

There may be five shutter members and these may be evenly spaced around the periphery of the opening. Handles may be attached to the flange and to the ring member to facilitate operation. A layer of foam plastic or rubber may be attached to the base plate to improve the contact with an abutting surface.

BRIEF DESCRIPTION OF THE DRAWINGS

The invention will now be more particularly described by way of example with reference to the drawings in which.

DESCRIPTION OF SEVERAL PREFERRED EMBODIMENTS

Figure 2:
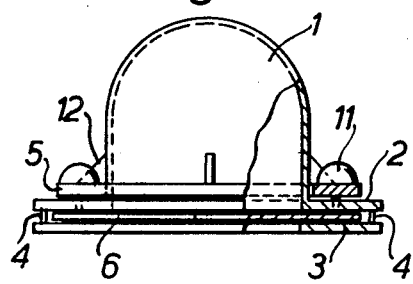
FIG. 2 is a side elevation partially in section.
Figure 1:
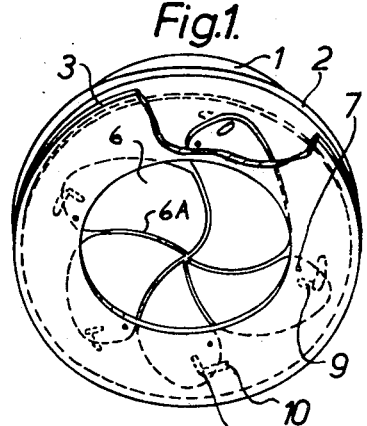
FIG. 1 is a perspective from below and partially broken away.

The embodiment shown in FIGS. 1 and 2 comprises a domed chamber 1 of circular cross-section around the edge of which is a circular flange 2. An annular base plate 3 is attached to the flange 2 by pins 4 so that the flange 2 and the base plate 3 are relatively fixed but spaced apart. A ring member 5 fits over the chamber 1 and rests on top of the flange 2. This ring member 5 is angularly displaceable relative to the chamber, the flange and the base plate.

In the space between the flange 2 and the base plate 3 are positioned five shutter members 6, spaced evenly around the circular flange. These shutter members are each attached by a pivot 7 to the base plate 3 (FIG. 2). A radially disposed slot 9 is provided in each shutter member and a pin 8 is attached to the ring member 5 and cooperates with the slot 9. Each pin 8 passes through a circumferentially disposed slot 10 in the flange 2 which lies between the shutter members and the ring member. A number of knobs 11 are attached to the top of the ring member 5. The ring member is prevented from sliding over the chamber and out of contact with the flange by three buttresses 12 attached to the chamber walls.

In operation, the ring member 5 is turned relatively to the flange 2 by means of the knobs 11. The motion of the ring member causes the shutter members to turn in synchronization upon their pivots so that, depending upon their direction of motion, they either all swing in front of the chamber to close it, or swing away from the chamber leaving it open, becoming positioned completely between the flange and the base plate. Even when the shutter members are in the closed position a small gap 6A remains between each adjacent one as best seen in FIG. 1.

Figure 3:
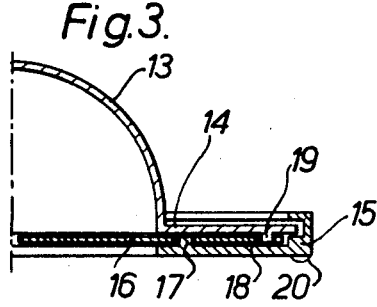
FIGS. 3 to 7 show alternative methods of mounting shutter members in the embodiment of FIGS. 1 and 2.

FIG. 3 shows part of another embodiment of the invention in cross-section. It comprises a domed chamber 13 surrounded by and integral with a circular flange 14. The flange 14 is a snap fit over an annular base plate 15. Five shutter members 16 are interposed between the base plate 15 and the flange 14, each cooperating with a pivot 17 integral with the base plate. Each shutter member 16 has a radially-disposed slot 18 which engages a pin 19. If the dome is turned relative to the base plate, each of the pins 19 also moves so that its associated shutter member turns on its pivot 17. The base plate is fitted with rubber pads 20 which act as feet.

Figure 4:
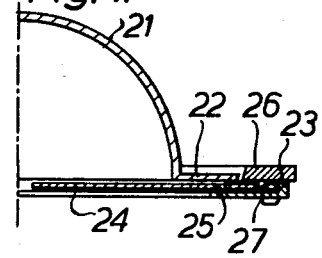

FIG. 4 shows part of another embodiment in cross-section. In this case the dome 21, together with its integral annular flange 22, are fixed relative to the annular base plate 23. The shutter members 24 are each mounted between the flange 22 and the base plate 23 on a pivot 25 which interconnects the flange and the base plate. Outside the flange and concentric with it is a movable ring member 26 which has pins 27 for engaging a radially disposed slot in each of the shutter members. Thus, when the ring member 26 is angularly displaced relative to the dome and the base plate, the movement of the pins 27 causes the shutter members to move either outwards or inwards. In a variation of this embodiment the movable ring member 26 may be mounted underneath the flange 22 so that the shutter members are positioned between the ring member and the flange.

Figure 5:
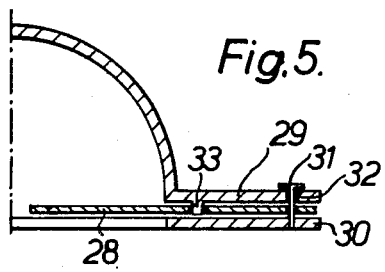

In the embodiment shown in FIG. 5, shutter members 28 are positioned between the flange 29, which is integral with the dome and the base plate 30. Each of the shutter members engages a pivot 31 projecting upwards from the base plate and engaging an arcuate slot 32 in the flange 29. Each shutter has a radially disposed slot for engaging a pin 33 projecting downwardly from the flange 29.

Figure 6:
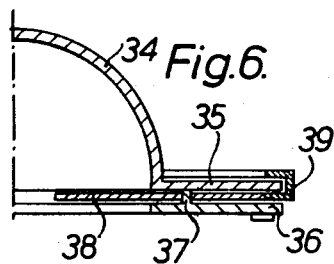
Figure 6A:
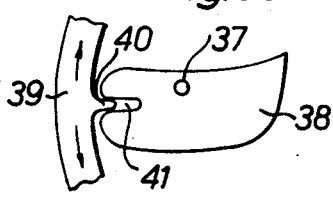

FIG. 6 is a part cross-section of yet another embodiment of the invention. It comprises a dome 34, having an integral circular flange 35. The flange is connected to a base plate 36 by a plurality of pivots 37. A plurality of shutter members 38 are positioned between the flange and the base plate, each shutter member being mounted on one of the pivots 37. A movable ring member 39 engages the rim of the flange 35 by means of a slot. As best seen in FIG. 6a the ring member has a radially directed spigot 40 for engaging a radial slot 41 in each of the shutter members so that rotation of the ring 39 produces pivoting of the shutters 38 about the pivots 37 between open and closed positions.

Figure 7:
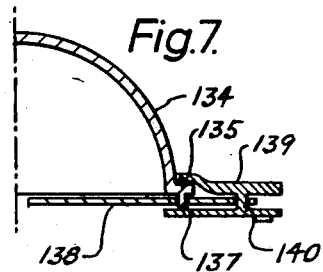

FIG. 7 shows an embodiment similar to that shown in FIG. 4, except that the ring member 139 overlaps the flange 135 which is integral with the dome 134. In this embodiment the shutter members 138 are mounted on pivots 137 and are operated by pins 140 engaged in radial slots in the members.

Other embodiments of the invention may include balls cooperating with grooves or slots, or cooperating cogs, where pins are used in the embodiments described above.

The trap may be decorated, for example, so that the dome resembles a barred cage.

The device may include retaining clips around the side of the flange and base plate. Such clips may be positioned so as to act as stops and prevent over-run of the mechanism. The retaining clips may provide a flat sliding surface on which the angularly displaceable member may easily slide. They may also provide sideways restraint.

I claim:

1. A portable trap for insects and other small creatures comprising:
   a. a base plate for contacting a surface upon which the trap is placed,
   b. a dome disposed above the base plate to define a chamber for retaining the insect or other small creature,
   c. said base plate having a central opening communicating with said chamber so that the trap can be placed over an insect or other small creature with the base plate around the insect or other small creature to capture it,
   d. a plurality of shutter members pivotally mounted around the periphery of the opening in said base member, and
   e. means for operating said shutter members in unison to open and close said shutter members while said trap is placed over an insect or other small creature.

2. A trap according to claim 1 wherein there are five shutter members.

3. A trap according to claim 1 wherein the shutter members are pivoted on a fixed member and engage an angularly displaceable member, the shutter members being operated in unison when the angularly displaceable member is turned relative to the fixed member.

4. A trap according to claim 1 wherein there is a gap between adjacent shutter members even when they are in the closed position.

5. A trap comprising a dome defining a chamber of circular cross section and an opening to the chamber from the underside of the dome, a circular flange extending outwardly from the edge of the opening, a plurality of shutter members pivotally mounted with respect to the flange and between the flange and a base plate fixed relatively to the flange, and a ring member mounted concentrically with the flange and in engagement with the shutter members so that in operation depending upon the direction in which the ring member is turned, the shutter members turn in synchronization upon their pivots either to open or close the chamber opening.

6. A trap according to claim 5 wherein resilient means are attached to the underside of the trap.

7. A trap according to claim 5 including handle means for operating the shutter members.

* * * * *